US009250591B2

(12) United States Patent
Yagi et al.

(10) Patent No.: US 9,250,591 B2
(45) Date of Patent: Feb. 2, 2016

(54) ULTRASONIC WAVE SENSOR AND IMAGE FORMING APPARATUS

(71) Applicant: CANON KABUSHIKI KAISHA, Tokyo (JP)

(72) Inventors: Yasutaka Yagi, Mishima (JP); Tsutomu Ishida, Suntou-gun (JP); Tadashi Okanishi, Mishima (JP); Teruhiko Namiki, Mishima (JP); Motoyasu Muramatsu, Susono (JP); Masaki Kobayashi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/563,782

(22) Filed: Dec. 8, 2014

(65) Prior Publication Data

US 2015/0160598 A1 Jun. 11, 2015

(30) Foreign Application Priority Data

Dec. 11, 2013 (JP) ................................ 2013-255668
Dec. 27, 2013 (JP) ................................ 2013-272034

(51) Int. Cl.
*G03B 15/00* (2006.01)
*G03G 15/00* (2006.01)

(52) U.S. Cl.
CPC .. *G03G 15/5029* (2013.01); *G03G 2215/00611* (2013.01); *G03G 2215/00637* (2013.01); *G03G 2215/00776* (2013.01)

(58) Field of Classification Search
CPC ................................................ G03G 15/5029
See application file for complete search history.

(56) References Cited

U.S. PATENT DOCUMENTS

2009/0003857 A1* 1/2009 Kuramochi et al. ............ 399/45
2009/0269091 A1* 10/2009 Yuasa ............................ 399/45
2010/0295241 A1* 11/2010 Isogai ........................... 271/227
2011/0142459 A1* 6/2011 Aoki .............................. 399/12
2011/0142461 A1* 6/2011 Nakamura et al. .............. 399/45
2014/0270825 A1* 9/2014 Iwasa et al. ..................... 399/45

FOREIGN PATENT DOCUMENTS

JP 2003-176063 A 6/2003
JP 2005-241954 A 9/2005
JP 2008-145514 A 6/2008
JP 2008-254919 A 10/2008
JP 2011-46511 A 3/2011
JP 2012181425 A * 9/2012 ............ G03G 15/00
JP 2012-194339 A 10/2012
JP 2012194361 * 10/2012 ............ G03B 21/00

* cited by examiner

*Primary Examiner* — W B Perkey
(74) *Attorney, Agent, or Firm* — Canon USA, Inc. IP Division

(57) ABSTRACT

A sensor is attached to an apparatus having a fixing unit which fixes an image on a recording medium by heating the recording medium. The sensor includes: a transmission unit transmitting an ultrasonic wave to the recording medium; a reception unit receiving the ultrasonic wave via the recording medium, and output a signal corresponding to the received ultrasonic wave; and a detecting unit detecting information relating to a state of the recording medium which has changed by passing through the fixing unit, based on a first signal which the reception unit has output upon having received the ultrasonic wave before the recording medium has passed through the fixing unit, and a second signal which the reception unit has output upon having received the ultrasonic wave after the recording medium has passed through the fixing unit.

20 Claims, 11 Drawing Sheets

ULTRASONIC WAVE SENSOR AND IMAGE FORMING APPARATUS

BACKGROUND OF THE INVENTION

1. Field of the Invention

The present invention relates to a technology for detecting the state of a recording medium.

2. Description of the Related Art

Conventionally, there are image forming apparatuses such as copying machines, printers, and so forth, which have sensors to detect the state of recording media, inside of the image forming apparatus. These apparatuses automatically detect the state of a recording medium, and control transfer conditions (e.g., transfer voltage, conveyance speed of the recording medium at the time of transfer) and fixing conditions (e.g., fixing temperature, conveyance speed of the recording medium at the time of fixing), according to the detection results.

One example of a state of the recording medium to be detected is the moisture included in the recording medium. Different moisture amounts included in the recording medium changes the resistance value and heat capacity of the recording medium, so image quality may deteriorate of images are recorded on recording media under the same transfer conditions and fixing conditions. Accordingly, these apparatuses detect the amount of moisture included in the recording medium, and control the transfer conditions and fixing conditions according to the results of detection.

Japanese Patent Laid-Open No. 2008-145514 describes an image forming apparatus where a lever to detect the thickness of the recording medium is provided in a conveyance path. When the recording medium is conveyed, the lever is pressed upwards by an amount equivalent to the thickness of the recording medium, and the thickness of the recording medium can be detected by the amount of displacement of the lever. This image forming apparatus detects the amount of moisture included in the recording medium by comparing the thickness of the recording medium before passing through a fixing unit and after having passed through the fixing unit. The transfer conditions and the like are controlled according to the moisture amount detection results, thereby improving image quality.

However, the configuration described in Japanese Patent Laid-Open No. 2008-145514 is a configuration to detect thickness by the lever coming into direct contact with the recording medium, there are cases where the precision of thickness detection, and accordingly the precision of moisture amount detection, deteriorates due to the effects of flapping of the recording medium being conveyed. Also, in a case where the recording medium is thin paper, change in the amount of moisture hardly changes the thickness at all, so accurately detecting the amount of moisture has been difficult. Accordingly, while the configuration described in Japanese Patent Laid-Open No. 2008-145514 could obtain moisture amount detection precision sufficient for satisfying the image quality desired at that time, there has been demand in recent years for improved moisture amount detection precision, to satisfy the image quality demanded nowadays.

SUMMARY OF THE INVENTION

A sensor is attached to an apparatus having a fixing unit which fixes an image on a recording medium by heating the recording medium. The sensor includes: a transmission unit configured to transmit an ultrasonic wave to the recording medium; a reception unit configured to receive the ultrasonic wave via the recording medium, and output a signal corresponding to the received ultrasonic wave; and a detecting unit. The detecting unit is configured to detect information relating to a state of the recording medium which has changed by passing through the fixing unit, based on a first signal which the reception unit has output upon having received the ultrasonic wave before the recording medium has passed through the fixing unit, and a second signal which the reception unit has output upon having received the ultrasonic wave after the recording medium has passed through the fixing unit.

Further features of the present invention will become apparent from the following description of exemplary embodiments with reference to the attached drawings.

DESCRIPTION OF THE EMBODIMENTS

Embodiments of the present invention will be described with reference to the drawings. It should be noted that the following embodiments are only exemplary, and do not restrict the scope of the present invention thereby.

First Embodiment

Figure 1:
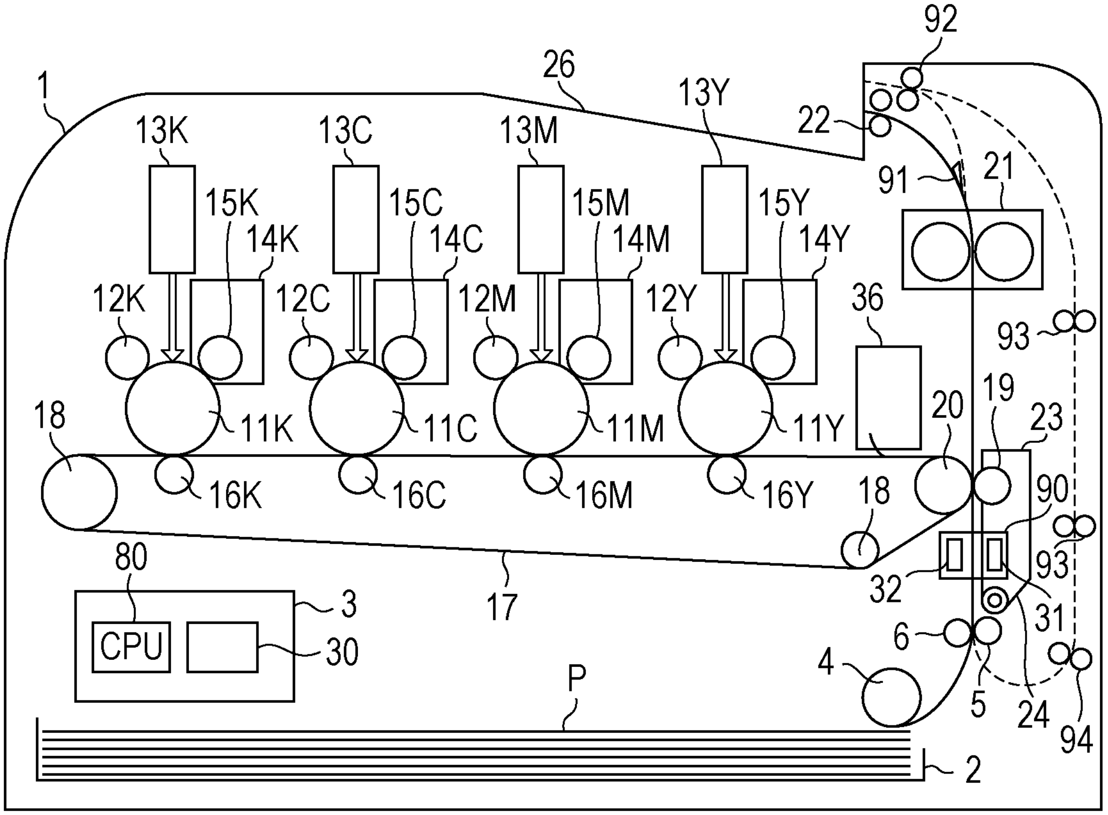
FIG. 1 is a configuration diagram of a tandem system color image forming apparatus according to first through fifth embodiments of the present invention.

An ultrasonic wave sensor according to the present embodiment can be used in an image forming apparatus such as a copying machine or printer or the like, for example. FIG. 1 is a configuration diagram illustrating a tandem system (four-drum) image forming apparatus, employing an intermediate transfer belt, as an example of the image forming apparatus in which the ultrasonic wave sensor is installed. A configuration where information relating to the amount of moisture included in a recording medium before passing through a fixing unit is detected, as information relating to change in the state of the recording medium, will be described in this embodiment.

The components of the image forming apparatus 1 illustrated in FIG. 1 are as follows. Reference numeral 2 denotes a sheet feed cassette which accommodates a recording medium P. Reference numeral 3 denotes an image forming control unit which controls operations of an image forming unit of the image forming apparatus 1. Reference numeral 4 denotes a supply roller to supply the recording medium P from the sheet feed cassette 2. Reference numeral 5 denotes a conveyance roller which conveys the recording medium P supplied by the supply roller 4. Reference numeral 6 denotes a conveyance opposing roller which opposes the conveying roller 5. Reference numerals 11Y, 11M, 11C, and 11K denote photosensitive drums which bear developing agent (toner) of the colors yellow, magenta, cyan, and black. Reference numerals 12Y, 12M, 12C, and 12K denote charging rollers serving as primary charging member for each of the colors, to charge the photosensitive drums 11Y, 11M, 11C, and 11K to a predetermined uniform potential. Reference numerals 13Y, 13M, 13C, and 13K denote optical units which irradiate the photosensitive drums 11Y, 11M, 11C, and 11K, charged by the primary charging members, by laser beams corresponding to image data of each color, thus forming electrostatic latent images. Reference numerals 14Y, 14M, 14C, and 14K denote developing units for visualizing the electrostatic latent images formed on the photosensitive drums 11Y, 11M, 11C, and 11K. Reference numerals 15Y, 15M, 15C, and 15K denote developing agent conveying rollers which feed developing agent within the developing units 14Y, 14M, 14C, and 14K to portions facing the photosensitive drums 11Y, 11M, 11C, and 11K. Reference numerals 16Y, 16M, 16C, and 16K denote primary transfer rollers (transfer members) for each floor, to perform primary transfer of the images formed on the photosensitive drums 11Y, 11M, 11C, and 11K. Reference numeral 17 denotes an intermediate transfer belt 17 which bears an image subjected to primary transfer. Reference numeral 18 denotes a driving roller which drives the intermediate transfer belt 17, 19 denotes a secondary transfer roller (transfer unit) which transfers an image formed on the intermediate transfer belt 17 onto a recording medium P which has been conveyed, and 20 denotes a secondary transfer opposing roller opposing the secondary transfer roller 19. Reference numeral 21 denotes a fixing unit which fixes the image transferred onto the recording medium P while the recording medium P is being conveyed, and 22 denotes a discharge roller which externally discharges the recording medium P, which has been fixed by the fixing unit 21, from the image forming apparatus 1. Reference numeral 91 denotes a flapper, 92 reversal rollers, 93 and 94 denotes duplex conveying rollers, and 90 denotes an ultrasonic wave sensor which has a transmission unit 31 and a reception unit 32.

Next, the image forming operations of the image forming apparatus 1 will be described. The image forming control unit 3 includes a central processing unit (CPU) 80, which centrally controls the image forming operations of the image forming apparatus 1. Image forming commands and image data are input to the image forming control unit 3 from a host computer or the like, omitted from illustration. The image forming apparatus 1 thereupon starts image forming operations, and a recording medium P is supplied from the sheet feed cassette 2 by the supply roller 4. The recording medium P is conveyed by the conveyance roller 5 and conveyance opposing roller 6, toward the nip portion (omitted from illustration) formed by the secondary transfer roller 19 and secondary transfer opposing roller 20, so as to be timed correctly with the image formed on the intermediate transfer belt 17. Along with the operation of the recording medium P being supplied from the sheet feed cassette 2, the photosensitive drums 11Y, 11M, 11C, and 11K are changed to a constant potential by the charging rollers 12Y, 12M, 12C, and 12K. The optical units 13Y, 13M, 13C, and 13K expose the surfaces of the charged photosensitive drums 11Y, 11M, 11C, and 11K by laser beams to form electrostatic latent images, in accordance with input image data. The formed electrostatic latent images are visualized by developing performed using the developing units 14Y, 14M, 14C, and 14K and the developing agent conveying rollers 15Y, 15M, 15C, and 15K. The electrostatic latent images formed in the surfaces of the photosensitive drums 11Y, 11M, 11C, and 11K are developed by the developing units 14Y, 14M, 14C, and 14K in their respective colors. The photosensitive drums 11Y, 11M, 11C, and 11K are each in contact with the intermediate transfer belt 17, and rotate synchronously with the intermediate transfer belt 17. The developed images of the respective colors are transferred onto the intermediate transfer belt 17 in order by the primary transfer rollers 16Y, 16M, 16C, and 16K, so as to form one superimposed image. The image formed on the intermediate transfer belt 17 are secondary-transferred onto the recording medium P by the secondary transfer roller 19 and secondary transfer opposing roller 20. The image transferred onto the recording medium P is fixed by being heated and pressurized by a fixing unit 21 including a fixing roller and so forth. Developing agent remaining on the intermediate transfer belt 17 without being transferred onto the recording medium P is cleaned by a cleaning unit 36.

In a case where no image forming is to be performed on the back face of the recording medium P, the recording medium P upon which the image has been formed is guided to a conveyance path where discharge rollers 22 have been provided, by the flapper 91, and is discharged to a discharge tray 26. This conveyance path is indicated by a solid line in FIG. 1. On the other hand, in a case where image forming is to be performed on the back face of the recording medium P, the recording medium P is guided by the flapper 91 to a conveyance path where the reversal rollers 92 are provided. This conveyance path is indicated by a dotted line in FIG. 1. The reversal roller 92 conveys the recording medium P in the direction of being externally discharged, and rotates in reverse for a predetermined amount of time after the trailing edge of the recording medium P (the edge of the recording medium P furthest upstream in the conveyance direction) passes the flapper 91. The reversal rollers 92 then convey the recording medium P to duplex conveying rollers 93. The duplex conveying rollers 93 convey the recording medium P to duplex conveying rollers 94, where the recording medium P temporarily stops. Thereafter, the recording medium P is conveyed to the conveyance roller 5 and conveyance opposing roller 6 at a predetermined timing, and image formation is performed in the same way as with the front face.

Next, the ultrasonic wave sensor 90 will be described. The ultrasonic wave sensor 90 (hereinafter also simply "90") is capable of detecting the grammage of the recording medium P. The term grammage means the mass of the recording medium P per unit area, and is expressed in terms of grams per square meter, or $g/m^2$. The sensor 90 which detects the grammage of the recording medium P is disposed on the upstream side of the secondary transfer roller 19 and secondary transfer opposing roller 20 in the conveyance direction of the recording medium in the image forming apparatus 1 illustrated in FIG. 1. The sensor 90 has the transmission unit 31 to transmit an ultrasonic wave and the reception unit 32 to receive ultrasonic wave, which are disposed across the conveyance path of the recording medium P. The transmission unit 31 is held at a secondary transfer unit 23 along with the secondary transfer roller 19. The secondary transfer unit 23 operates to open and close by pivoting on a rotational shaft 24, whereby even if the recording medium P becomes jammed around the secondary transfer unit 23 while being conveyed, the user can easily remove the jammed recording medium P. The control unit 3 also includes, in addition to the CPU 80, an ultrasonic wave sensor control unit 30 (hereinafter, "sensor control unit 30") which performs transmission/reception and detects grammage of the recording medium P. The CPU 80 controls various image forming conditions in accordance with the detection results of grammage, obtained by the sensor control unit 30. Image forming conditions as used here include, for example, the conveyance speed of the recording medium P, the value of voltage to be applied to the primary transfer roller 16 and secondary transfer roller 19, the temperature at the time of fixing the image on the recording medium P at the fixing unit 21, and so forth. As a further image forming condition, the CPU 80 may control the rotational speed of the primary transfer roller 16 and secondary transfer roller 19 when forming images. Moreover, the CPU 80 may control the rotational speed of fixing rollers of the fixing unit 21 as an additional image forming condition at the time of fixing the image.

The transmission unit 31 and the reception unit 32 have similar configurations, each being configured including a piezoelectric element (or simply "piezo element"), which is an inter-conversion element of mechanical displacement and electric signals, and electrode terminals. Inputting pulsed voltage of a predetermined frequency to the electrode terminals of the transmission unit 31 causes the piezoelectric element to oscillate and generate a sound wave. When a recording medium P is interposed therebetween, the emitted sound wave is transmitted through the air and reaches the recording medium P. Upon the sound wave reaching the recording medium P, the recording medium P is vibrated by the sound wave. Vibration of the recording medium P transmits the sound wave which further travels through the air and reaches the reception unit 32. The sound wave which has been transmitted from the transmission unit 31 reaches the reception unit 32 in a state of having been attenuated by the recording medium P. The piezoelectric element of the reception unit 32 outputs a voltage value corresponding to the amplitude of the received sound wave to the electrode terminals. This is the operational principle of transmitting and receiving an ultrasonic wave using piezoelectric elements.

Figure 2A:
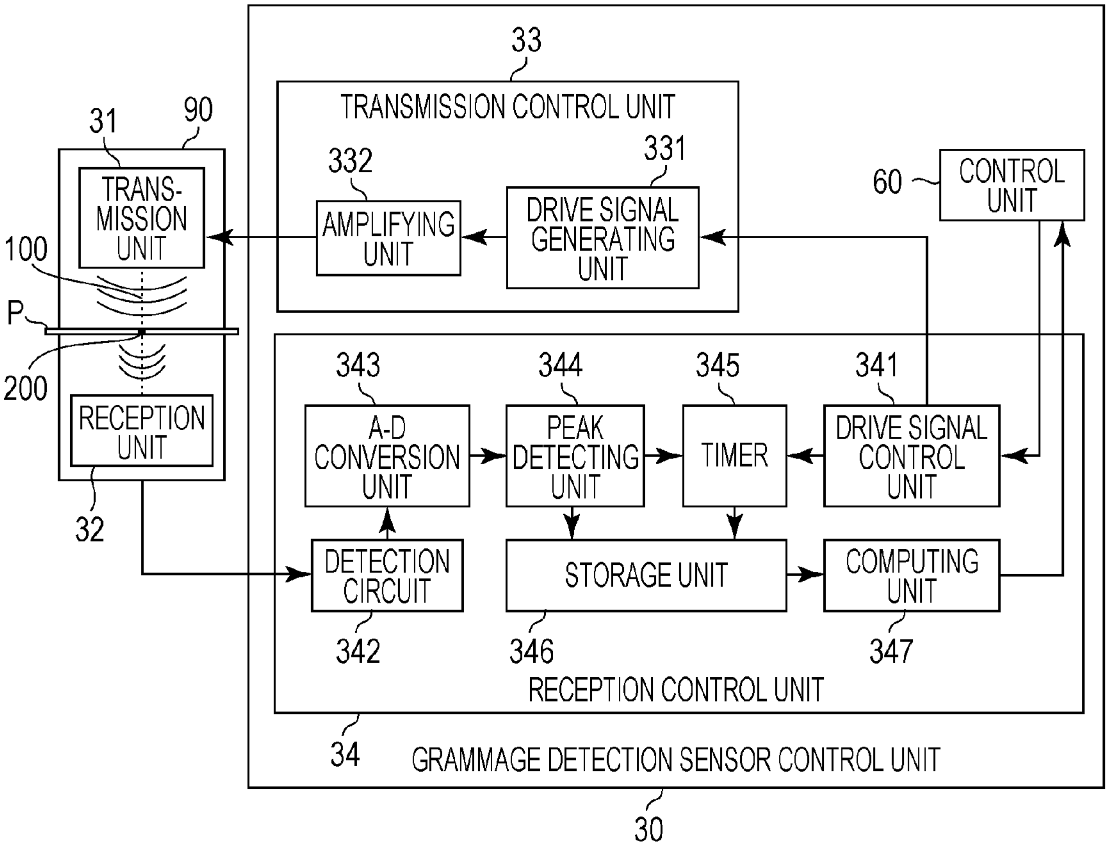
FIGS. 2A and 2B are block diagrams illustrating the configuration of a control unit of an ultrasonic wave sensor according to the first through fifth embodiments of the present invention.

Next, the method for detecting the grammage of the recording medium P using the sensor 90 will be described with reference to the block diagram in FIG. 2A. The transmission unit 31 and reception unit 32 according to the present embodiment transmit and receive a 32 KHz frequency ultrasonic wave. The frequency of the ultrasonic wave is selected beforehand, and a suitable range may be selected in accordance with the configuration of the transmission unit 31 and reception unit 32, detection precision, and so forth. The sensor control unit 30 has a transmission control unit 33 which functions to generate a drive signal for transmission of the ultrasonic wave and amplify the drive signal, and a reception control unit 34 which functions to detect the ultrasonic wave received by the reception unit 32 as voltage values, and process the signal. The sensor control unit 30 further includes a control unit 60 which controls each part of the sensor control unit 30 to detect the grammage of the recording medium P.

Figures 3A, 3B, 3C:
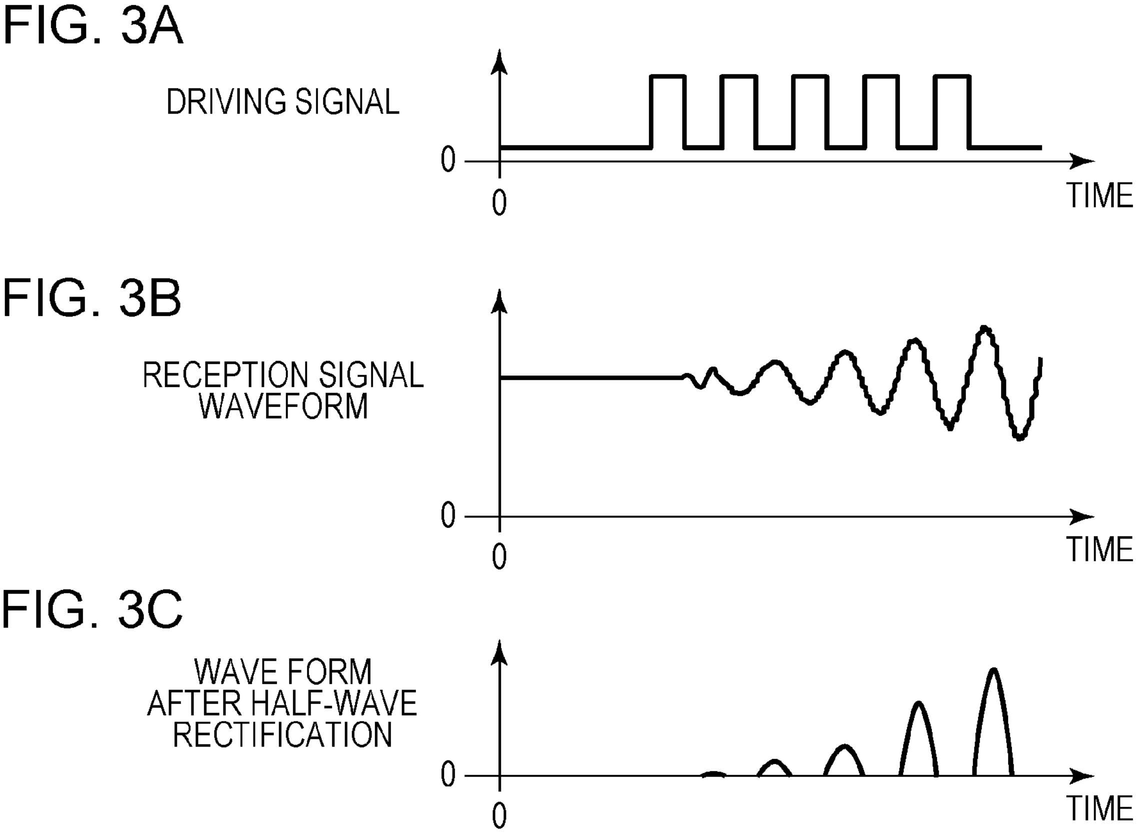
FIGS. 3A, 3B, and 3C are diagrams illustrating an example of drive signals and reception waveforms of the ultrasonic wave sensor according to the first through fifth embodiments of the present invention.

A signal indicating starting of measurement is input from the control unit 60 to a drive signal control unit 341. Upon receiving the input signal, the drive signal control unit 341 instructs a drive signal generating unit 331 to generate drive signals. The drive signal generating unit 331 generates and outputs signals having the frequency set beforehand. FIG. 3A illustrates the waveform of drive signals generated by the drive signal generating unit 331. Five individual 32 kHz pulse waves are consecutively output in one measurement according to the present embodiment. The output of the pulse waves is then ceased a predetermined amount of time until the sound waves have been completely attenuated, following which pulse waves are output again and the next measurement is performed. This serves to reduce the influence of disturbance such as reflected waves from the recording medium P and surrounding members, and so forth, so the reception unit 32 receives only the direct waves which the transmission unit 31 has emitted. Such signals are called burst waves. An amplifying unit 332 amplifies the signal level (voltage value), and outputs to the transmission unit 31.

Figure 2B:
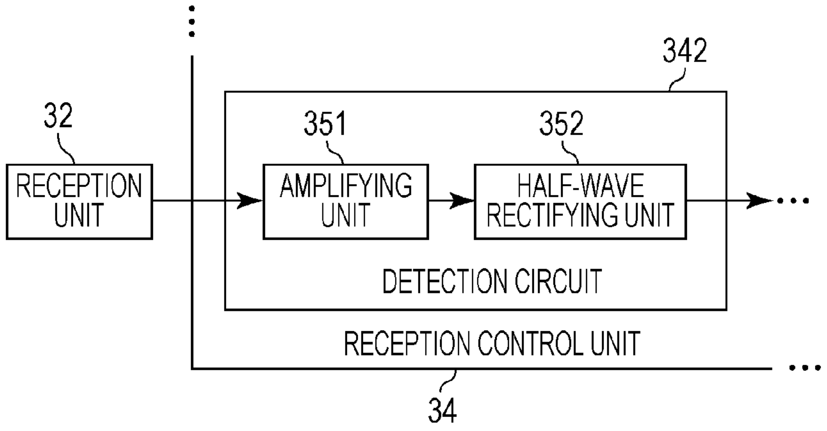

The reception unit 32 receives the ultrasonic waves transmitted from the transmission unit 31 or the ultrasonic waves attenuated at the recording medium P, and outputs received signals to a detection circuit 342 of the reception control unit 34. The detection circuit 342 includes an amplifying unit 351 and a half-wave rectifying unit 352, as illustrated in FIG. 2B. The amplifying unit 351 according to the present embodiment is configured so as to change the amplification rate of the received signals depending on whether or not a recording medium P is present at a detection position 200 between the transmission unit 31 and the reception unit 32. This detection position 200 is an imaginary position existing in a region to which the recording medium P is conveyed, and is a position where an ultrasonic wave is emitted from the transmission unit 31. Upon the recording medium P being conveyed to the detection position 200, the ultrasonic wave transmitted from the transmission unit 31 reaches the recording medium P, whereby the reception unit 32 can receive the ultrasonic wave attenuated at the recording medium P. For example, the position in FIG. 2A where an imaginary line 100 connecting the center of the transmission unit 31 and the center of the reception unit 32 intersects the recording medium P conveyed into that region, can be taken as the detection position 200. The recording medium P is conveyed to the detection position 200 by the conveyance roller 5 and conveyance opposing roller 6. The half-wave rectifying unit 352 subjects the signals amplified at the amplifying unit 351 to half-wave rectifying, but is not restricted thusly. FIG. 3B illustrates the waveform of received signals at the reception unit 32, and FIG. 3C illustrates the waveform of signals after half-wave rectifying. The signals generated at the detection circuit 342 are converted from analog signals to digital signals at an A-D conversion unit 343. The peak value (maximum value) of the signals is detected by a peak detecting unit 344 based on the converted digital signals. A timer 345 starts counting at the timing at which the drive signal control unit 341 has instructed generating of the drive signals, and measures the time up to the peak detecting unit 344 detecting the peak value. The value detected by the peak detecting unit 344 and the time measured by the timer 345 are each saved in a storage unit 346. The above-described operations are performed a predetermined number of times at predetermined intervals, for states with and without the recording medium P present at the detection position 200 between the transmission unit 31 and reception unit 32. A computing unit 347 calculates computation coefficients from the ratio between an average value of a predetermined number of peak values in the state where the recording medium P is not present, and an average value of a predetermined number of peak values in the state where the recording medium P is present. The computation coefficients are values corresponding to grammage, and accordingly the control unit 60 detects the grammage of the recording medium P based on the computation coefficients calculated by the computing unit 347. The CPU 80 controls the image forming conditions of the image forming apparatus 1 based on the detection results of the grammage. Alternatively, the CPU 80 may directly control the image forming conditions of the image forming apparatus 1 from the values of the computation coefficients, without the control unit 60 detecting the grammage of the recording medium P.

Figure 4:
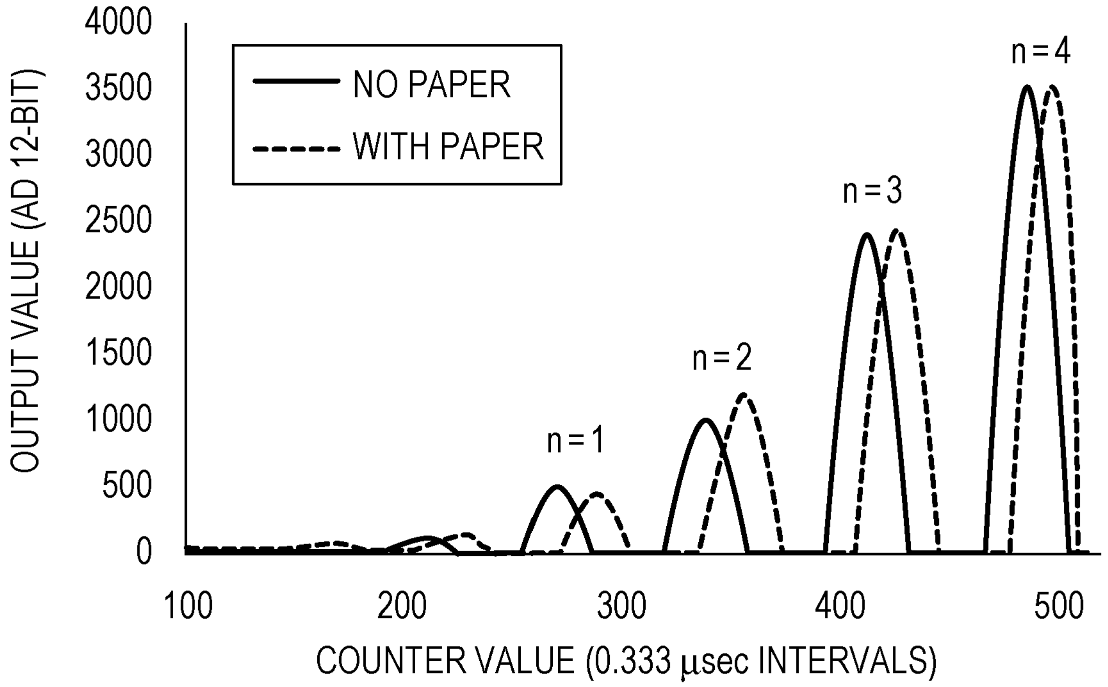
FIG. 4 is a diagram illustrating an example of output waveforms of the ultrasonic wave sensor according to the first through fifth embodiments of the present invention.

FIG. 4 illustrates the waveforms of received signals regarding the recording medium P according to the present embodiment. The recording medium P used here was recording paper (hereinafter, simple "paper") with grammage of 60 g/$m^2$. The horizontal axis represents the counter value, which is elapsed time from the transmission unit 31 having transmitted the ultrasonic wave, and the vertical axis represents the output value corresponding to the amplitude of the ultrasonic wave. In the present embodiment, the counter frequency of the timer 345 is 3 MHz (0.333 μsec intervals), and the resolution of the peak detecting unit 344 is A-D 12-bit 3.3 V (0.806 mV intervals). The amplification rate of the detection circuit 342 is set to 16 fold, so that data can be acquired in a stable manner even when the paper is present at the detection position 200 between the transmission unit 31 and reception unit 32. The solid lines and dashed lines represent waveforms with and without paper, respectively. Hereinafter, the term "no paper" refers to a state where there is no paper at the detection position 200 between the transmission unit 31 and reception unit 32, and the term "with paper" refers to a state where there is paper present at the detection position 200 between the transmission unit 31 and reception unit 32. The reason that the peak value appears cyclically in FIG. 4 is because burst waves are being input. The reason why the peak value detection timing differs depending whether or not there is paper, is because the ultrasonic waves are attenuated by the paper, and thus the speed of the ultrasonic waves becomes slower. As illustrated in FIG. 4, the values of the first two peaks (n=1, 2 in FIG. 4) are small, indicating that there are cases where stable peak values cannot be obtained depending on presence/absence of paper, and the type of paper. On the other hand, as early a peak value as possible is obtained within the range that the amplitude can be obtained, due to the effects of disturbance such as reflected waves after a certain amount of time elapses after transmitting the ultrasonic waves. Accordingly, grammage detection is performed in the present embodiment using the peak value of n=3 in FIG. 4.

Figure 5:
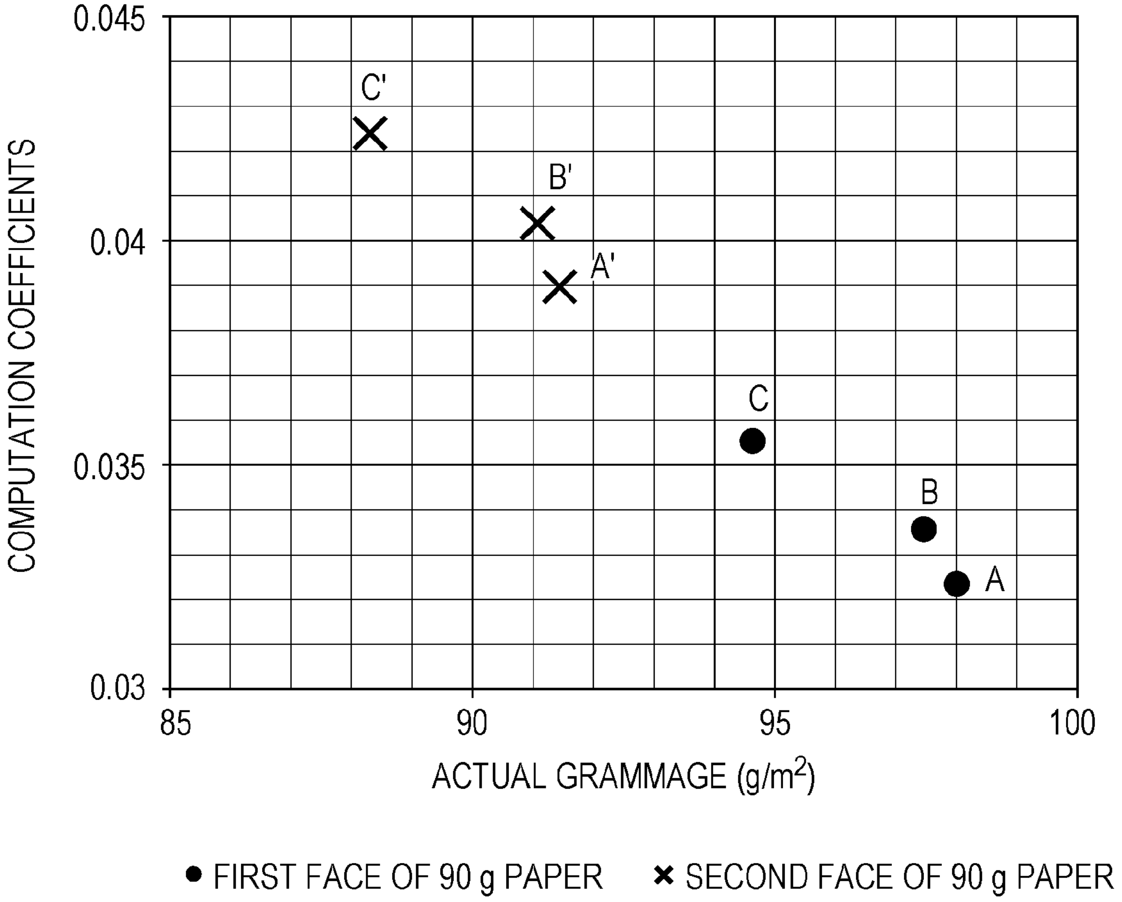
FIG. 5 is a diagram illustrating correlation between computation coefficients of a recording medium detected by the ultrasonic wave sensor according to the first embodiment of the present invention.

Next, the results of having detected grammage before the recording medium P passes through the fixing unit 21, and the results of having detected grammage after the recording medium P has passed through the fixing unit 21, are illustrated in FIG. 5. An example will be described where images are formed on both faces of the recording medium P. The recording medium P used here was XEROX Business 4200 90 g paper, left standing in the sheet feed cassette 2 under an environment of temperature 30° C. and humidity 80% for 48 hours. The horizontal axis in the graph in FIG. 5 represents the actual grammage. The actual grammage is a value obtained by dividing by area the mass measured using electronic scales. The vertical axis in the graph in FIG. 5 represents the computation coefficients. The computation coefficients are obtained in the present embodiment by dividing the average value of a predetermined number of peak values in a state where recording medium P is present by the average value of a predetermined number of peak values in a state where recording medium P is not present. In the graph in FIG. 5, the solid circles are plotted representing the results of detection before forming the image on the first face (front face). The Xs are plotted representing the results of detection before forming the image on the second face (back face). The actual grammage was measured promptly after forming the image on the first face, and computation coefficients were obtained promptly thereafter, before forming the image on the second face. In other words, the solid circles are plotted representing the results before passing through the fixing unit 21 the first time, and the Xs are plotted representing the results of having passed through the fixing unit 21 one time. The symbols A, B, and C, in FIG. 5, represent different paper, and these are affixed with a prime symbol (') to indicate having passed through the fixing unit 21.

It can be seen from FIG. 5 that the actual grammage of each of A, B and C, is 6 to 7 g/$m^2$ lighter in the detection results after having passed through the fixing unit 21, as compared to the detection results before passing through the fixing unit 21. The reason is that the paper is heated and pressurized when passing through the fixing unit 21 at the time of forming the image on the first face. More specifically, moisture included in the paper evaporates in the process, and is released from the paper into the atmosphere, so the grammage of the paper becomes lighter by an equivalent amount. The present invention takes note of this characteristic, and detects the amount of moisture included in the recording medium P from the difference between the grammage of the recording medium P before passing through the fixing unit 21 the first time, and the and the grammage after having passed through the fixing unit 21 once.

It can also be seen in FIG. 5 that the actual grammage and computation coefficients are in a linear relation, such that the larger the actual grammage is, the smaller the computation coefficient is, and the smaller the actual grammage is, the larger the computation coefficient is. Accordingly, the actual grammage can be detected by detecting the computation coefficient with the configuration of the present embodiment, and the amount of moisture can be detected by obtaining the difference between the grammage of the recording medium P before passing through the fixing unit 21 the first time, and the grammage after having passed through the fixing unit 21 once. The detected amount of moisture is stored in the storage unit 346 by the sensor control unit 30.

In the present embodiment, a value obtained by multiplying by 1,000 the absolute value of the difference between the calculation coefficient of the recording medium P before passing through the fixing unit 21 the first time, and the calculation coefficient after having passed through the fixing unit 21 once, is defined as the moisture amount included in the recording medium P (information relating to moisture amount), for sake of convenience. For example, in the case of paper A, (0.03903−0.03238)×1000=6.65, so the amount of moisture is 6.65. The amount of moisture continued in paper differs depending on the state in which the paper is stored, and the amount of moisture contained in paper left standing for a long time under an environment of temperature 30° C. and humidity 80% (hereinafter, referred to as "standing paper") is around 6.65. On the other hand, paper immediately after having been removed from its wrapper (hereinafter referred to as "newly-opened paper") has less moisture amount. In the present embodiment, paper regarding which the detected amount of moisture is 1.5 or more is defined as standing paper, and paper regarding which the detected amount of moisture is less than 1.5 is defined as newly-opened paper. Note that the method for calculating the amount of moisture is not restricted to this method, and an arrangement may be made where the difference between the computation coefficient of the paper before passing through the fixing unit 21 the first time and the computation coefficient after having passed through the fixing unit 21 once is normalized by the computation coefficient after having passed through the fixing unit 21 once, or the like. The CPU 80 controls various image forming conditions according to the amount of moisture, in the same way as with the case of grammage. For example, with regard to secondary transfer, if the amount of moisture contained in the paper is great, the resistance value of the paper drops, and transfer current readily escapes to the margin portions. As a result, transfer defects readily occur. Therefore, there may be a need to increase the value of voltage applied to the secondary transfer roller 19 (hereinafter, described as "secondary transfer bias"). Also, with regard to fixing, the heat capacity of paper containing a great amount of moisture is also great, so the fixing temperature has to be raised accordingly.

Table 1 illustrates the detection results of the amount of moisture under an environment of temperature 30° C. and humidity 80% in the first embodiment, secondary transfer bias at the time of forming an image on the first face, and fixing temperature settings. There are standing paper and newly-opened paper for each of the three types of paper each with different grammage, for a total of six types of paper in this example. A table is stored in the storage unit 346 storing the moisture amounts and image forming conditions shown in Table 1, from which the CPU 80 reads out data and sets image forming conditions.

TABLE 1

Moisture Amount and Image Forming Conditions for First Face, According to Difference in Storage State of Paper

| | MOISTURE AMOUNT | SECONDARY TRANSFER BIAS | FIXING TEMPERATURE |
|---|---|---|---|
| 60 g NEWLY-OPENED | 0.51 | 800 V | 200° C. |
| 60 g STANDING | 3.32 | 1300 V | 205° C. |
| 75 g NEWLY-OPENED | 0.61 | 900 V | 210° C. |
| 75 g STANDING | 3.95 | 1400 V | 215° C. |
| 90 g NEWLY-OPENED | 1.02 | 1000 V | 220° C. |
| 90 g STANDING | 6.65 | 1500 V | 225° C. |

Overall, when the amount of moisture is small, the secondary transfer bias and fixing temperature are both set low, and the secondary transfer bias and fixing temperature are both set high for the standing paper of which the amount of moisture is great. While an example of setting the secondary transfer bias and fixing temperature according to the amount of moisture is described in the present embodiment, other image forming conditions may be set, such as charging bias, developing bias, laser beam intensity, conveyance speed of paper, and so forth. Here, the charging bias means the value of voltage to be applied to the charging roller 12, and developing bias means the value of voltage to be applied to the developing agent conveying rollers 15Y, 15M, 15C, and 15K. For example, in a case of standing paper where the secondary transfer bias has to be set high, the charging bias, developing bias, and laser beam intensity are set so that the amount of developing agent in the toner images formed by developing the electrostatic latent images on the photosensitive drums 11Y, 11M, 11C, and 11K is greater. Thus, even if transfer current escapes to the margins as described above, and a greater amount of residual toner remains on the intermediate transfer belt 17 after secondary transfer, an amount of developing agent can be transferred onto the paper.

Next, the timing for setting the image forming conditions and performing image formation based on the results of the detected amount of moisture will be described. The ultrasonic wave sensor 90 according to the present embodiment can detect grammage without temporarily stopping the paper, so even when consecutively forming images on multiple sheets of paper, the grammage of the paper for when printing on the first face and the second face can be detected in real time, without temporarily stopping image formation. Accordingly, optimal image forming conditions can be set based on the amount of moisture calculated from the difference in grammage (or computation coefficient) at the time of forming an image on the first face of a first sheet and at the time of forming an image on the second face thereof, and this can be reflected when forming an image on the first face of a subsequent second sheet.

Figure 6A:
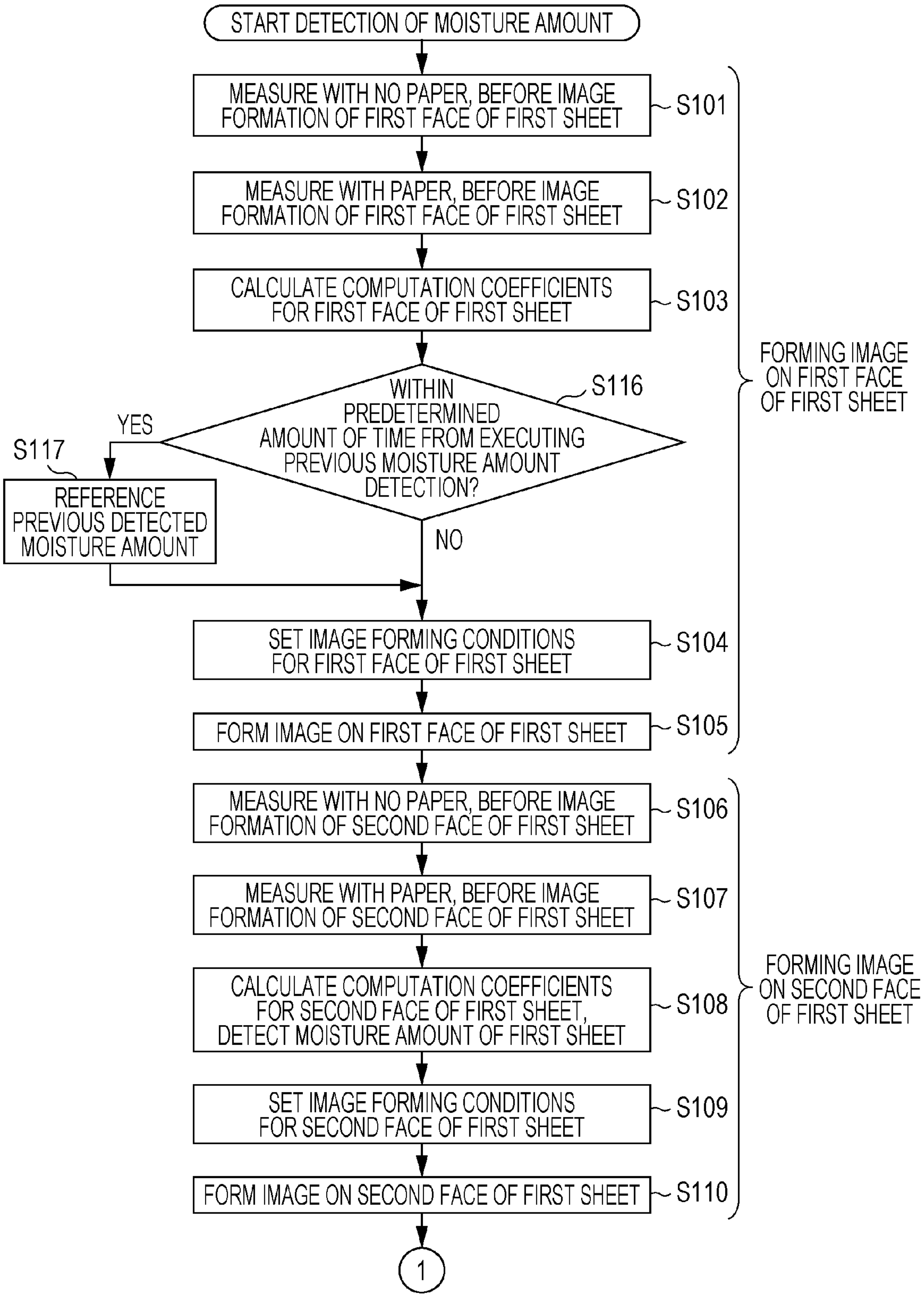
FIGS. 6A and 6B are flowcharts according to the first embodiment of the present invention.
Figure 6B:
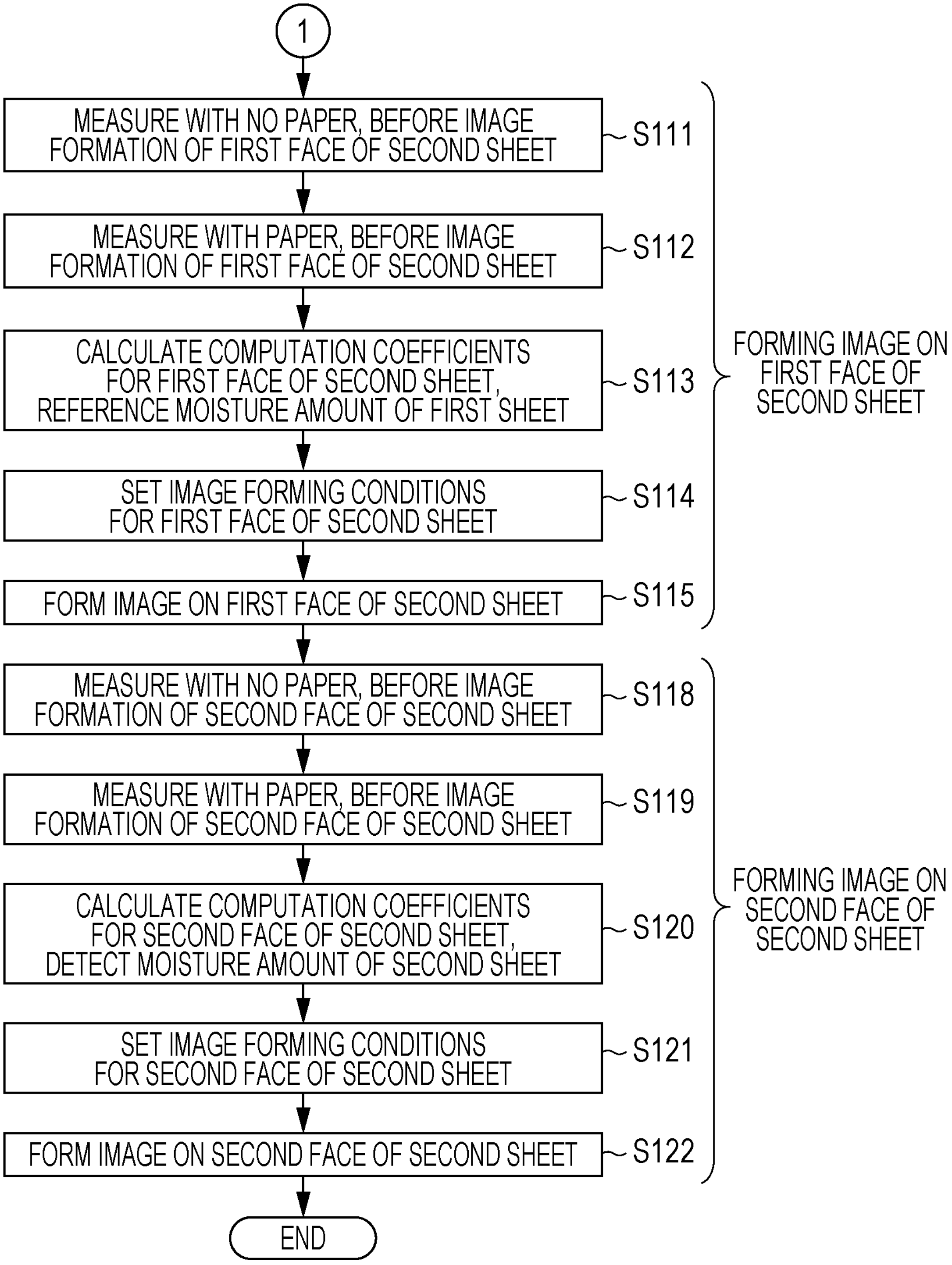

Next, detection of amount of moisture and control of image forming conditions according to the present embodiment will be described with reference to the flowcharts in FIGS. 6A and 6B. FIGS. 6A and 6B illustrate an example of consecutively forming images on both faces of two sheets of paper. The control based on the flowcharts in FIGS. 6A and 6B is executed by the CPU 80, sensor control unit 30, and so forth, based on programs stored in unshown ROM or the like. FIG. 6A is a flowchart relating to the first sheet, and FIG. 6B is a flowchart relating to the second sheet.

First, operations regarding the first sheet will be described with reference to the flowchart in FIG. 6A. Before starting formation of an image on the first face of the first sheet, the sensor control unit 30 transmits and receives an ultrasonic wave in a state where there is no paper at the detection position 200 between the transmission unit 31 and the reception unit 32 (hereinafter referred to as "no-paper measurement", S101). Next, the sensor control unit 30 transmits and receives an ultrasonic wave in a state where there is paper at the detection position 200 between the transmission unit 31 and the reception unit 32 (hereinafter referred to as "with-paper measurement", S102), and calculates the computation coefficient for the first face of the first sheet (103). Here, the sensor control unit 30 determines whether or not a predetermined amount of time has elapsed from detecting the amount of moisture the previous time, for example, within the past 12 hours (S116). If 12 hours or more have elapsed from the previous detection, the previously-detected amount of moisture is not used, since the likelihood that the amount of moisture contained in the paper has changed since is great. Based on the calculation coefficient calculated in step S103, the CPU 80 sets the image forming conditions for the first face of the first sheet (S104), and performs image forming (S105). If within 12 hours, determination is made that the change in the amount of moisture contained in the paper is small, so the amount of moisture detected the previous time is used. The sensor control unit 30 calls up and references the previous amount of moisture from the storage unit 346, and the CPU 80 sets the image forming conditions for the first face of the first sheet along with the calculation coefficient obtained in S103 (S104), and performs image forming (S105).

In the same way for the second face of the first sheet as with the first face, the sensor control unit 30 calculates the calculation coefficient (S108) from the no-paper measurement (S106) and with-paper measurement (S107), the CPU 80 sets the image forming conditions (S109), and performs image forming (S110). At the same time, the sensor control unit 30 detects the amount of moisture of the first sheet from the results in S103 and S108, and stores this in the storage unit 346. The image forming conditions for the second face may be the same as with the first face, or may be conditions set with the secondary transfer bias and fixing temperature reduced from those of the first face by a predetermined value. If changes can be made right away, image forming conditions may be set reflecting the amount of moisture detected in S108.

Operations regarding the second sheet will be described with reference to the flowchart in FIG. 6B. In the same way as with the first sheet, the sensor control unit 30 calculates the calculation coefficient (S113) for the first face of the second sheet from the no-paper measurement (S111) and with-paper measurement (S112), At the same time, the sensor control unit 30 calls up and references the amount of moisture of the first sheet from the storage unit 346, and the CPU 80 sets the image forming conditions for the first face of the second sheet along with the calculation coefficient obtained in S113 (S114), and performs image forming (S115).

In the same way for the second face of the second sheet as with the second face of the first sheet, the sensor control unit 30 calculates the calculation coefficient (S120) from the no-paper measurement (S118) and with-paper measurement (S119), the CPU 80 sets the image forming conditions (S121), and performs image forming (S122). At the same time, the sensor control unit 30 calculates the amount of moisture of the second sheet from the results in S113 and S120, and stores this in the storage unit 346, to be reference at the time of setting the image forming conditions for the first face of the third sheet. This amount of moisture detection and control of image forming conditions is performed in the same way for the third and subsequent jobs. Alternatively, the CPU 80 may directly control the image forming conditions of the image forming apparatus 1 from the values of the calculation coefficient for the first face and second face, without the sensor control unit 30 detecting the amount of moisture.

Note that while the validity of the amount of moisture detected the previous time has been described as being determined based on the elapsed time from the previous detection of amount of moisture in the present embodiment, the present invention is not restricted to this. An arrangement may be made where an environment sensor (omitted from illustration) is used, and the value of the environment sensor at the time of detecting the amount of moisture the previous time is compared with the value of the environment sensor at the time of detecting the amount of moisture this time, and the validity of the amount of moisture detected the previous time is determined depending on the magnitude of the change in values. In other words, in a case where the ambient environment (temperature, humidity, etc.) has changed greatly, the amount of moisture contained in the recording medium P also has changed, so the amount of moisture is to be detected again. On the other hand, in a case where the ambient environment has not changed much, the amount of moisture contained in the recording medium P has not changed much either, so the amount of moisture is not to be detected again. Also, an arrangement may be made where detection results of a sensor (omitted from illustration) which detects opening/closing of the cassette 2 are used to determine validity of the amount of moisture detected the previous time. In other words, the sensor detects whether or not the cassette 2 has been opened somewhere between the previous moisture amount detection and the moisture amount detection this time. In a case where the cassette 2 has been opened, the likelihood that the recording medium P accommodated in the cassette 2 has been replaced or added is high, so the amount of moisture is to be detected again. There are also cases where the amount of moisture differs between paper which has been stacked at the bottom of the cassette 2 and left standing for a long period of time, paper on the top, and paper in between. The paper on the top within the cassette 2 is in contact with the atmosphere, and is readily affected thereby. On the other hand, the paper at the middle is protected by the paper above, and is not readily affected by the atmosphere. In an environment where the humidity is high, for example, the sheets paper on the top will have a greater amount of moisture than the sheets of paper at the middle or below. In such a case, optimal image forming conditions can be set by reflecting the newest detection results of the amount of moisture at the next sheet of paper. For example, in a case of forming images on 100 sheets at once, the detection results of the amount of moisture of the first sheet is reflected in the image forming conditions of the first face of the second sheet, and the detection results of the amount of moisture of the 99'th sheet is reflected in the image forming conditions of the first face of the 100'th sheet.

As described above, the amount of moisture contained in a recording medium can be detected in the present embodiment, by obtaining the difference between grammage before the recording medium passes through the fixing unit and after having passed through the fixing unit. Accordingly, the amount of moisture contained in the recording medium can be accurately detected.

Second Embodiment

A second embodiment will be described. A feature of this embodiment is that image forming conditions are set from the detected amount of moisture and the calculation coefficients of the second face. The primary portions are the same as with the first embodiment, so only portions which are different from the first embodiment will be described here.

In the first embodiment, the calculation coefficient of the first face of the second sheet, and the amount of moisture of the first sheet, were used to set image forming conditions for the first face of the second sheet. However, there are cases where sheets with little difference in grammage, such as 75 g paper and 80 g paper for example, are not readily determined regarding which is which by the calculation coefficient of the first face of the second sheet. Table 2 shows the calculation coefficients of the second face of the first sheet of 75 g paper and 80 g paper, the calculation coefficient of the first face of the second sheet, the amount of moisture of the first sheet, and image forming conditions.

TABLE 2

Amount of Moisture According to Difference in Storage State, Image Forming Conditions, and Calculation Coefficients of First and Second Faces

| | CALCULATION COEFFICIENT SECOND FACE FIRST SHEET | CALCULATION COEFFICIENT FIRST FACE SECOND SHEET | AMOUNT OF MOISTURE IN FIRST SHEET | SECONDARY TRANSFER BIAS | FIXING TEMPERATURE |
|---|---|---|---|---|---|
| 75 g NEWLY-OPENED | 0.04900 | 0.04830 | 0.70 | 900 V | 210° C. |
| 75 g STANDING | 0.04889 | 0.04426 | 4.63 | 1400 V | 215° C. |
| 80 g NEWLY-OPENED | 0.04455 | 0.04384 | 0.71 | 950 V | 215° C. |
| 80 g STANDING | 0.04400 | 0.03925 | 4.75 | 1450 V | 220° C. |

In a case of determining between the 75 g standing paper and the 80 g newly-opened paper, referencing the amount of moisture and calculation coefficients of the first face of the second sheet as with the first embodiment yields moisture amount of 4.63 and 0.71 respectively, as shown in Table 2, so the difference between standing paper and newly-opened paper can be easily detected. Next, the calculation coefficients of the first face of the second sheet are 0.04426 and 0.04384, with the 75 g standing paper being slightly greater than the 80 g newly-opened paper. Accordingly, the 80 g newly-opened paper and the 75 g standing paper can be determined from the amount of moisture of the first sheet and the calculation coefficients of the first face of the second sheet, by providing a threshold value between 0.04426 and 0.04384. However, the difference in calculation coefficients of the first face of the second sheet is small, so in a case where there is a certain amount of change in the calculation coefficients due to manufacturing variance of the paper, there is a high likelihood that wrong detection will be made. Therefore, at the time of setting the image forming conditions of the first face of the second sheet in the present embodiment, the precision of determination is improved by referencing the amount of moisture of the first sheet and the calculation coefficient of the second face of the first sheet. Description regarding the amount of moisture will be omitted, since this is the same as described above. From Table 2, it can be seen that the calculation coefficients of the second face of the first sheet is 0.04889 for the 75 g standing paper and 0.04455 for the 80 g newly-opened paper, which is a difference greater than that of the first face of the second sheet. As a result, the precision of determining between the 80 g newly-opened paper and the 75 g standing paper is improved, so it can be said that this is may be a configuration regarding setting optimal image forming conditions for each paper.

The flow for detection of the amount of moisture and control of image forming conditions is almost the same as with that in the first embodiment, illustrated in FIGS. 6A and 6B, so detailed description thereof will be omitted. A difference is that the sensor control unit 30 stores the calculation coefficient of the second face of the first sheet (S108) in the storage unit 346, and the CPU 80 references both the amount of moisture of the first sheet (S113) and the calculation coefficient of the second face of the first sheet (S108) to set the image forming conditions for the first face of the second sheet (S114).

As described above, image forming conditions are set based on the amount of moisture of the first sheet and the calculation coefficient of the second face of the first sheet in the present embodiment, so more optimal image forming conditions can be set.

Third Embodiment

Relationship Between Temperature Change and Grammage Detection Results

Figure 7A:
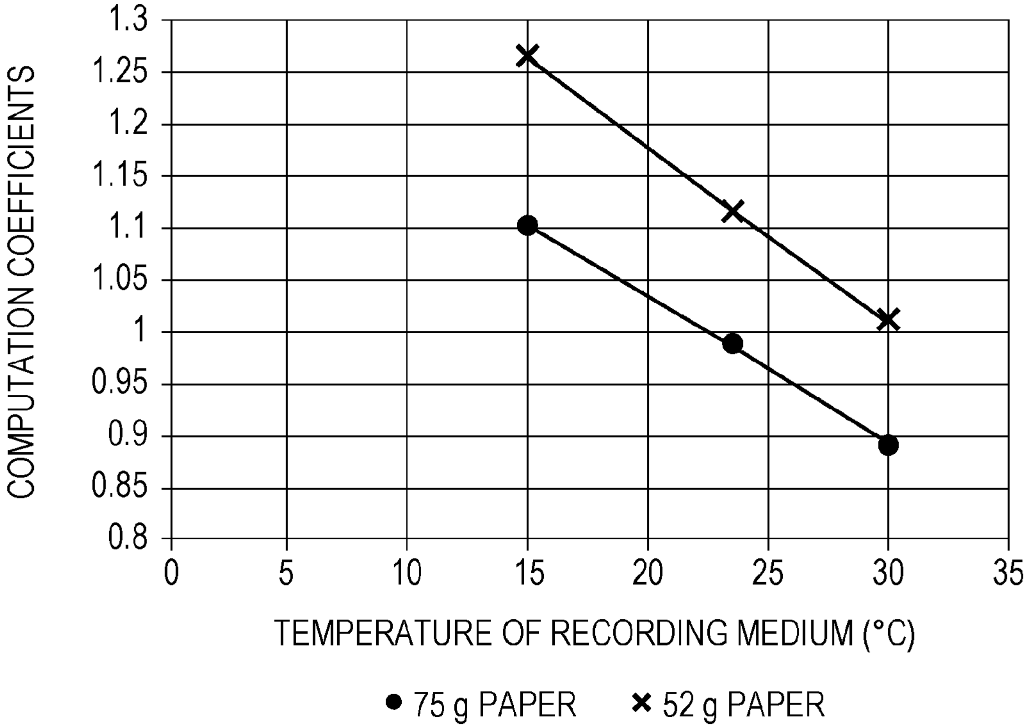
FIGS. 7A and 7B are diagrams illustrating the relationship between the temperature of recording medium and computation coefficients, according to the third embodiment of the present invention.

Next, a third embodiment will be described. A configuration will be described in the present embodiment which detects information relating to change in temperature of the recording medium, as information relating to change in the state of the recording medium. The relationship between temperature of recording medium and calculation coefficients, actually obtained by the present embodiment, is illustrated in FIG. 7A. The recording medium used was recording paper having grammage of 75 g/m$^2$ and recording paper having grammage of 52 g/m$^2$. The temperature of the recording medium was measured at three states of 15° C., 23.5° C., and 30° C.

It can be seen from FIG. 7A that the temperature of the recording medium and the calculation coefficients have a linear relationship. Accordingly, the difference in temperature of the recording medium can be correlated with difference in calculation coefficients of the same recording medium. The higher the temperature of the recording medium is, the smaller the calculation coefficient becomes, and the lower the temperature of the recording medium is, the larger the calculation coefficient becomes. The reason is that when the recording medium is holding heat, the temperature of the surrounding air rises, and air density falls.

Figure 7B:
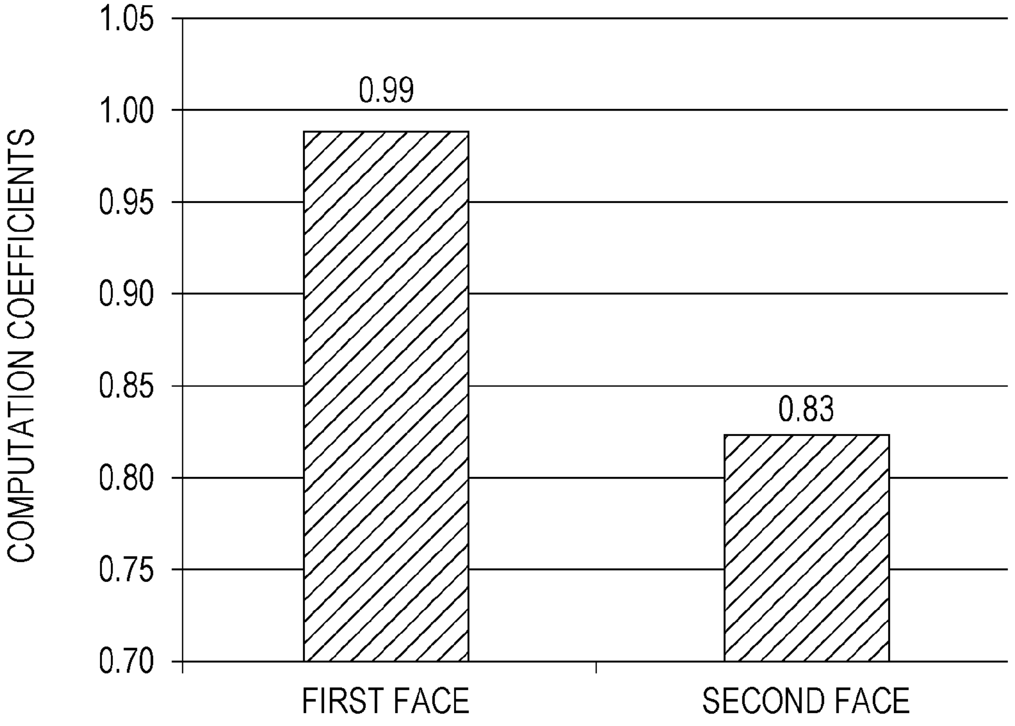

FIG. 7B illustrates the results of calculating calculation coefficients for each of before fixing an image of the first face and before fixing an image on the second face, when fixing images on both faces of recording paper having grammage of 75 g/m$^2$. Hereinafter, the calculation coefficient calculated before forming an image on the first face will be referred to as calculation coefficient of the first face, and the calculation coefficient calculated after forming an image on the first face but before forming an image on the second face will be referred to as calculation coefficient of the second face. In FIG. 7B, it can be seen that the calculation coefficient of the second face is smaller than the calculation coefficient of the first face. This is because the temperature of the recording medium is higher, due to heat obtained from the fixing unit 21. Accordingly, calculating the calculation coefficients by the configuration according to the present embodiment enables temperature change of the recording paper to be obtained based on the difference in calculation coefficients between the first face and the second face.

In the present embodiment, dividing the absolute value of the difference in calculation coefficients between the first face and the second face by 0.01 yields the temperature change of the recording paper, for convenience sake. For example, in the case in FIG. 7B, $$(0.99-0.83)/0.01=16$$

which means the temperature change is 16° C. The temperature of the recording medium rises by passing through the fixing unit 21, though the magnitude of temperature change differs depending on the fixing temperature at the time of fixing an image to the first face of the recording medium, the heat capacity of the recording medium, and so forth. Note that description is made in the present embodiment with regard to a case where the relationship between the difference of calculation coefficients and the change in temperature is fixed at 1:100 regardless of the temperature value. However, the relationship between the difference of calculation coefficients and the change in temperature may be different from this example in some situations. Even so, the method for obtaining temperature change from calculation coefficients can be set according to that situation, and thus various situations can be handled.

Setting Image Forming Conditions

The CPU 80 sets the optimal image forming conditions with regard to temperature change obtained as described above in the present embodiment. More specifically, in a case where the temperature of the recording medium at the time of fixing an image on the second face is higher than at the time of fixing an image on the first face, the fixing temperature for the second face is set to be lower than the fixing temperature for the first face. The easiest way to do this is to set a value obtained by subtracting the temperature change from the fixing temperature of the first face as the fixing temperature of the second face. Thus, overheating by the fixing unit 21 can be prevented in a case where the temperature of the recording medium is high, and consequently image deterioration such as hot offset and so forth can be suppressed. Hot offset is a phenomenon where toner on the recording medium adheres to a fixing roller in the fixing unit 21, and after one rotation of the roller, the toner is fixed at a different location on the recording medium.

Next, the timing for setting image forming conditions and performing image forming based on the obtained temperature change will be described. The ultrasonic wave sensor 90 according to the present embodiment can detect the grammage of recording paper without temporarily stopping the recording paper. Accordingly, even when consecutively forming images on multiple sheets of recording paper, the grammage of the all sheets of recording paper can be detected in real time, without temporarily stopping image formation. Thus, optimal image forming conditions can be set from the temperature change obtained from the difference in calculation coefficients between the first face and second face for example, and reflected when forming an image on the second face.

Figure 8:
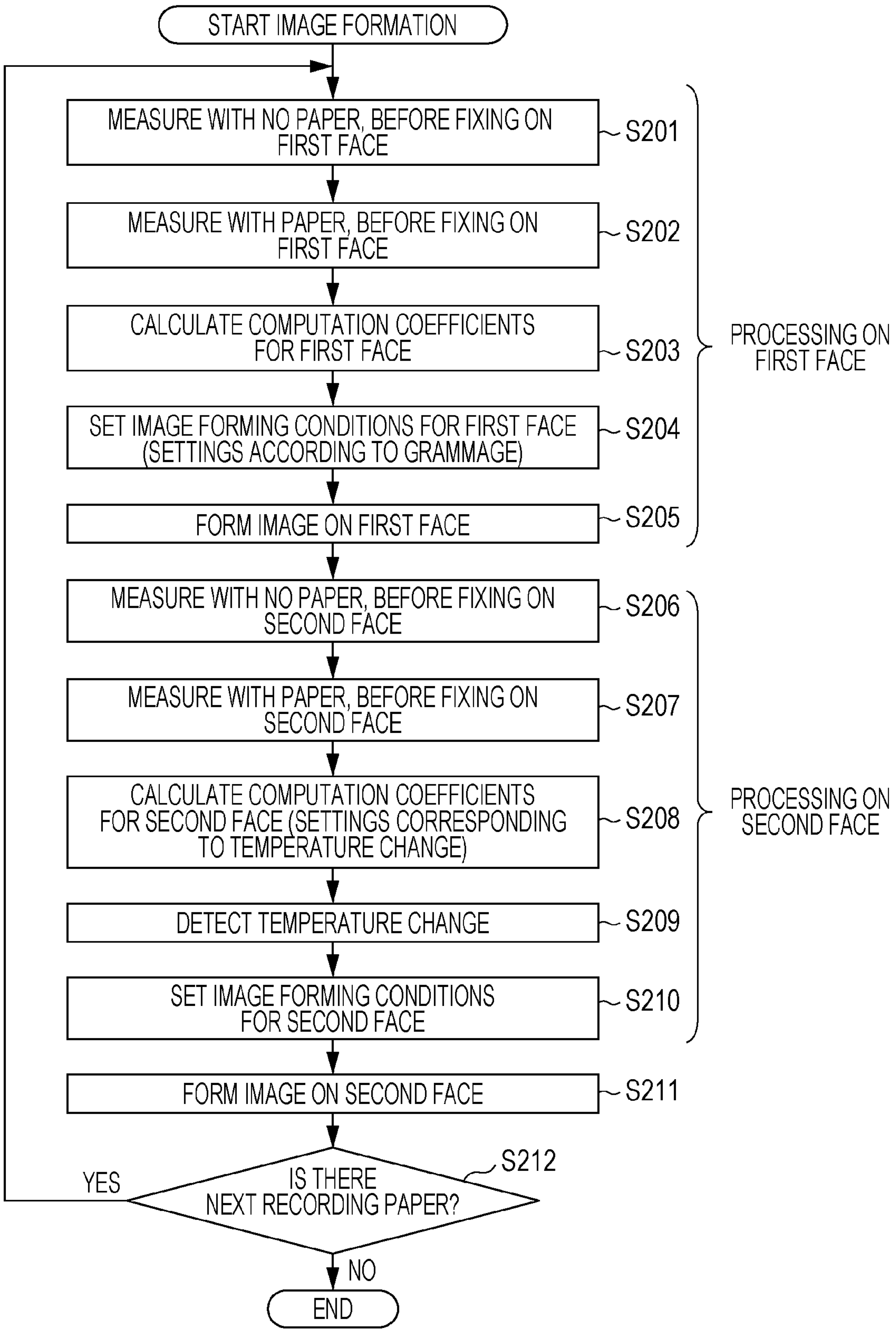
FIG. 8 is a flowchart according to the third embodiment of the present invention.

Control of image forming conditions according to the present embodiment will be described with reference to the flowchart in FIG. 8. The control based on the flowchart in FIG. 8 is executed by the CPU 80, sensor control unit 30, and so forth, based on programs stored in unshown ROM or the like. The following is an example of a job where images are consecutively formed on both faces of sheets of recording paper. First, before fixing an image on the first face of the recording paper, the sensor control unit 30 transmits and receives an ultrasonic wave in a state where there is no paper at the detection position 200 between the transmission unit 31 and the reception unit 32 ("no-paper measurement", S201). Next, the sensor control unit 30 transmits and receives an ultrasonic wave in a state where there is paper at the detection position 200 between the transmission unit 31 and the reception unit 32 ("with-paper measurement", S202), and calculates the computation coefficient for the first face (S203). Based on the calculated calculation coefficient, the CPU 80 sets the image forming conditions for the first face (S204), and performs image formation (S205). Next, the sensor control unit 30 calculates the calculation coefficient for the second face (S208) in the same way as with the first face, from no-paper measurement (S206) and with-paper measurement (S207). The sensor control unit 30 then calculates the temperature change of the recording paper from the results of S203 and S208 (S209). Thereafter, the CPU 80 sets image forming conditions based on the calculated temperature change amount (S210), and performs image formation (S211). Thereafter, if there is a next recording paper sheet (S212) the flow returns to S201, and if not, the flow ends.

As described above, the ultrasonic wave sensor 90 according to the present embodiment can calculate the change in temperature of the recording medium from having passed through the fixing unit 21, from the difference in the calculation coefficient before fixing an image on the first face and the calculation coefficient before fixing an image on the second face. Also, the image forming apparatus 1 according to the present embodiment can control the image forming conditions based on the change in temperature of the recording medium, so high-quality images can be obtained.

While an example of setting the fixing temperature in accordance with change in temperature has been described in the present embodiment, this is not restrictive. For example, the electric resistance of the recording medium also changes due to change in temperature thereof, so the voltage value applied to the primary transfer roller 16 and secondary transfer roller 19 may be controlled. Further, other image forming conditions described above may be controlled. Also, the CPU 80 may directly control the image forming conditions of the image forming apparatus 1 from the difference in value between calculation coefficients, without obtaining the change in temperature of the recording medium. The present embodiment has also been described as calculating calculation coefficients from the results of with-paper measurement and no-paper measurement. However, a configuration may be made where calculation coefficients are calculated from the results of with-paper measurement, and change in temperature of the recording medium is obtained therefrom.

Fourth Embodiment

A fourth embodiment will be described. A feature of the present embodiment is that the image forming conditions of the second face are set based on the time elapsed from performing detection by an ultrasonic wave up to fixing the image on the second face. Accordingly, optimal image forming conditions can be set for the timing at which the recording medium actually passes through the fixing unit 21, and consequently a high-quality image can be obtained. The primary portions are the same as with the third embodiment, so only portions which are different from the third embodiment will be described here.

Figure 9:
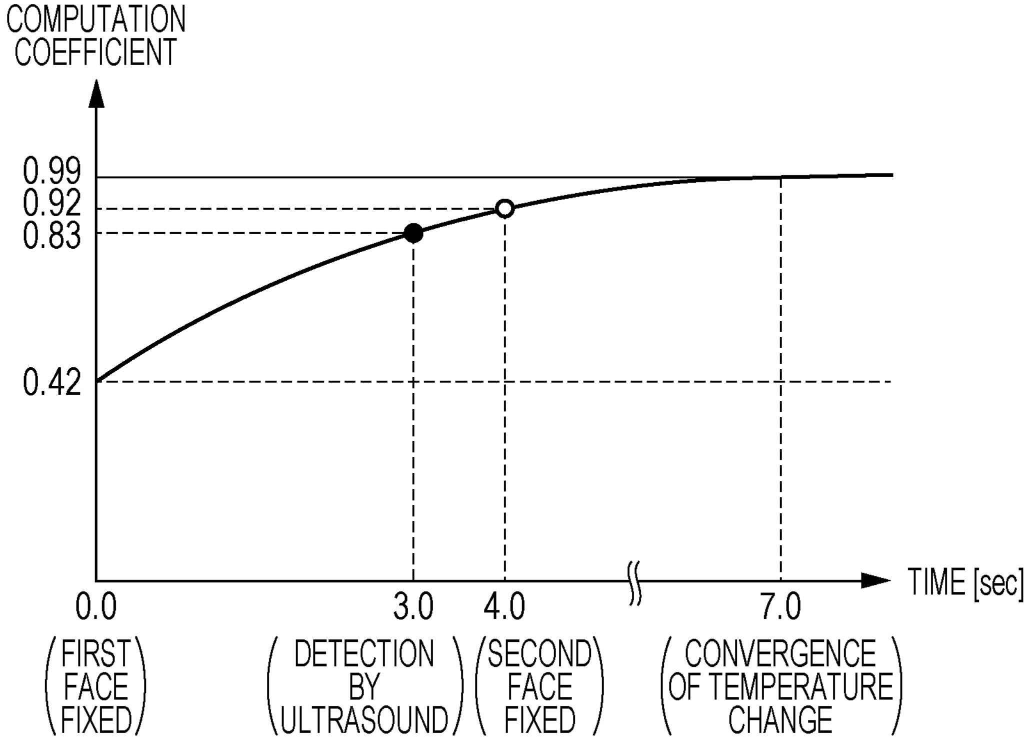
FIG. 9 is a diagram illustrating the change in calculation coefficient according to change in temperature of the recording medium, according to the fourth embodiment of the present invention.

In the third embodiment, change in temperature of the recording medium is obtained based on difference in calculation coefficients between the first face and second face, as described earlier. However, there is difference in time from the point of having performed detection by an ultrasonic wave (after having calculated the calculation coefficient for the second face) up to the point where the image is fixed on the recording medium, and there are cases where further change in temperature may occur in that time. The reason is that the temperature of the recording medium which has risen due to having formed the image on the first face converges on (falls to) the temperature before having formed the image on the first face, as time passes. FIG. 9 illustrates the way in which the calculation coefficient changes as time passes. The horizontal axis represents time elapsed from having fixed the first face, and the vertical axis represents calculation coefficients. The recording paper used was recording paper having grammage of 75 g/$m^2$. In FIG. 9, the black circle represents the timing of detection by an ultrasonic wave before fixing an image on the second face, and the white circle represents the timing of fixing an image on the second face. It can be seen that the calculation coefficient converges over time as the temperature change converges.

In the present embodiment, optimal image forming conditions at the timing at which the recording medium actually passes through the fixing unit 21 are set based on the time from having performed detection by an ultrasonic wave until fixing the image on the second face, in light of the above-described nature. Specifically, the amount of change of calculation coefficient over the time elapsed from fixing an image on the first face is measured beforehand, and stored in an unshown storage unit in the image forming control unit 3 as a profile such as illustrated in Table 3. The amount of change in the calculation coefficient from having performed detection by an ultrasonic wave up to fixing an image on the second face is calculated at the time of calculating temperature change in S209 in the third embodiment, and thus temperature change is calculated. For example, FIG. 9 illustrates detection by an ultrasonic wave being performed 3 seconds after fixing an image on the first face of the recording medium, and fixing of an image on the second face being performed 4 seconds after. Accordingly, temperature change can be calculated that the calculation coefficient has risen by 0.5−0.41=0.09 at the time of fixing an image on the second face, as compared to the time of detection by an ultrasonic wave.

TABLE 3

Relation Between Elapse of Time and Amount of Change of Calculation Coefficients

| | | | | | | | | |
|---|---|---|---|---|---|---|---|---|
| TIME (sec) | 0.0 | 0.5 | 1.0 | 1.5 | 2.0 | 2.5 | 3.0 | 3.5 |
| AMOUNT OF CHANGE OF CALCULATION COEFFICIENT | 0 | 0.1 | 0.18 | 0.26 | 0.32 | 0.37 | 0.41 | 0.46 |
| TIME (sec) | 4.0 | 4.5 | 5.0 | 5.5 | 6.0 | 6.5 | 7.0 | 7.5 |
| AMOUNT OF CHANGE OF CALCULATION COEFFICIENT | 0.5 | 0.52 | 0.54 | 0.55 | 0.56 | 0.56 | 0.57 | 0.57 |

As described above, higher image quality can be obtained by the image forming apparatus according to the present embodiment, by controlling image forming conditions based on the time up to fixing an image on the second face of the recording medium.

The information shown in Table 3 does not have to be measured beforehand as in the present embodiment. For example, an arrangement may be made where the recording medium is stopped at the detection position 200 after fixing an image on the first face of the first sheet of the job, and detection by ultrasonic waves is performed consecutively until temperature change converges, thereby calculating a calculation coefficient. The result may then be stored in an unshown storage unit, and image forming conditions of the second and subsequent sheets may be controlled according to this information. Further, the amount of change of the calculation coefficient may be approximated by interpolation according to time. Alternatively, multiple profiles depending on the environment may be stored in the storage unit, so that a particular profile can be selected therefrom according to the environment where the image forming apparatus 1 is situated. Note that the term "environment" here includes the temperature and humidity around the image forming apparatus 1, which can be detected by an environment sensor provided to the image forming apparatus 1.

Fifth Embodiment

A fifth embodiment will be described. A feature of the present embodiment is setting optimal image forming conditions according to the amount of moisture included in the recording medium, in addition to change in temperature of the recording medium. The primary portions are the same as with the third embodiment, so only portions which are different from the third embodiment will be described here.

Figure 10:
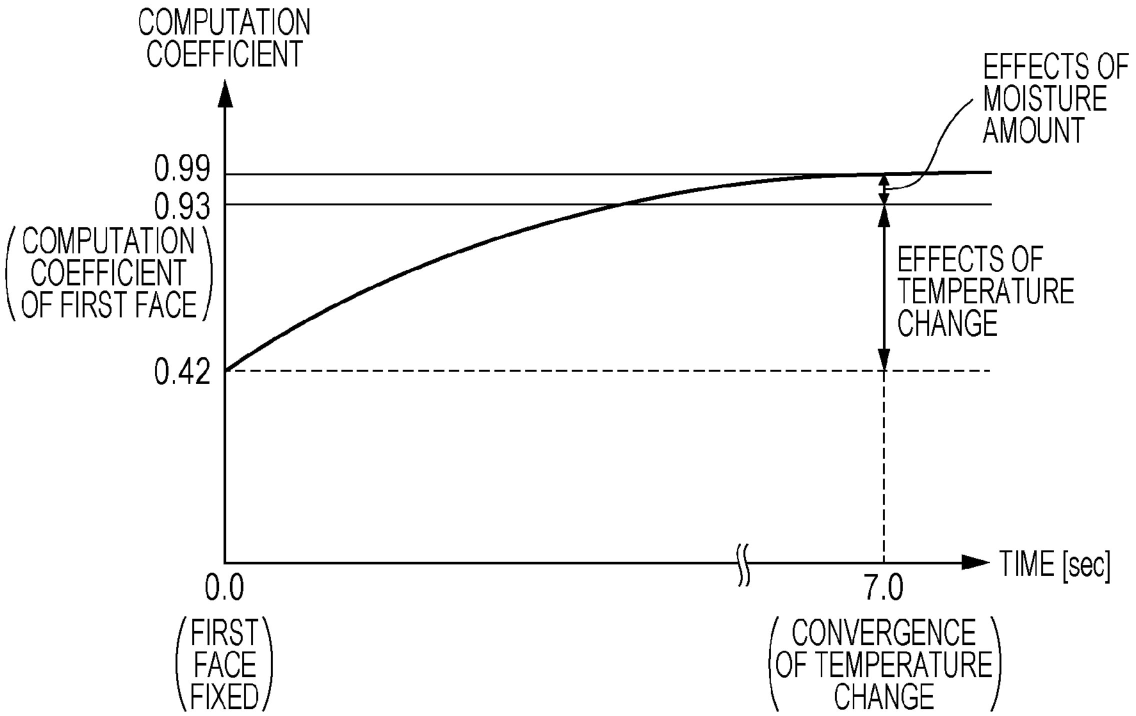
FIG. 10 is a diagram illustrating the relationship between change in the temperature of the recording medium and computation coefficients, according to the fifth embodiment of the present invention.

In a case where an image is fixed on a recording medium containing a great amount of moisture (hereinafter, "absorbent material"), the moisture contained in the recording medium evaporated due to the recording medium being heated and pressurized, so the grammage of the recording medium is reduced. Accordingly, the calculation coefficient at the time of the temperature change having converged after fixing an image on the second face is a greater value than the calculation coefficient for the first face. Accordingly, in order to take into consideration the effects of the amount of moisture, control has to be performed based on the calculation coefficient at the time of temperature change having converged. FIG. 10 illustrates the way in which the calculation coefficient changes over time for the absorbent material. The calculation coefficient for the first face is 0.93 but the calculation coefficient at the point of the temperature change having converged after fixing an image on the second face is 0.99, so the calculation coefficient has risen in comparison with the calculation coefficient for the first face. This difference of 0.06 represents the amount of moisture of the recording medium which evaporated at the time of fixing the image on the first face.

In the present embodiment, in a case where the calculation coefficient at the point of the temperature change having converged after fixing an image on the second face is greater than the calculation coefficient for the first face, the difference is deemed to be due to the amount of moisture in light of the above-described nature, and this is reflected in the image forming conditions. The heat capacity of a recording medium which does not contain very much moisture in comparison with an absorbent material (hereinafter, "non-absorbent material") is smaller than that of an absorbent material, so the temperature of the recording medium changes greatly due to passing through the fixing unit 21. Accordingly, the fixing temperature at the time of fixing an image on the second face of a non-absorbent material is to be lower than the fixing temperature at the time of fixing an image on the second face of an absorbent material. Specifically, the fixing temperature is set to be around 5° C. lower for a non-absorbent material, as compared with an absorbent material, as shown in Table 4. In the present embodiment, the fixing temperature of the second face is set to be lower than the calculated value in the third and fourth embodiments by a range of 0° C. to 5° C., depending on the amount of moisture. Also in the present embodiment, a recording medium regarding which the difference in calculation coefficients is 0.05 is more is regarded to be an absorbent material, and a recording medium regarding which the difference is less than 0.05 is regarded to be a non-absorbent material. While an example of setting the fixing temperature in accordance with amount of moisture contained in the recording medium has been described in the present embodiment, this is not restrictive. For example, the electric resistance of the recording medium also changes due to the amount of moisture contained therein, so the voltage value applied to the primary transfer roller 16 and secondary transfer roller 19 may be controlled. Further, the above-described other image forming conditions may be controlled.

The method for obtaining the calculation coefficient at the point that temperature change has converted after having fixed an image on the second face will be described. The recording medium is stopped at the detection position 200 after fixing an image on the first face of the first sheet of the recording medium, detection by ultrasonic waves is consecutively performed, and the calculation coefficient is calculated. The amount of change of the calculation coefficient decrease as time elapses as illustrated in FIG. 10. At the point that the amount of change of the calculation coefficient per unit time falls below a predetermined threshold value, the sensor control unit 30 determines that the calculation coefficient has converged. The sensor control unit 30 can then obtain the amount of moisture contained in the recording medium by using the calculation coefficient obtained at this time.

TABLE 4

| | OPTIMAL FIXING TEMPERATURE |
|---|---|
| 60 g (NON-ABSORBENT MATERIAL) | 200° C. |
| 60 g (ABSORBENT MATERIAL) | 205° C. |
| 75 g (NON-ABSORBENT MATERIAL) | 210° C. |
| 75 g (ABSORBENT MATERIAL) | 215° C. |
| 90 g (NON-ABSORBENT MATERIAL) | 220° C. |
| 90 g (ABSORBENT MATERIAL) | 225° C. |

As described above, the ultrasonic wave sensor 90 according to the present embodiment can obtain the amount of moisture contained in the recording medium before passing through the fixing unit 21, by the difference between the calculation coefficient before fixing an image on the first face and the calculation coefficient at the time of temperature change of the recording medium having converged. The image forming apparatus 1 according to the present embodiment can also control image forming conditions based on the amount of moisture contained in the recording medium, so high-quality images can be obtained.

Note that while determination is made in the present embodiment whether an absorbent material or a non-absorbent material, in accordance with the amount of moisture, and image forming conditions are controlled accordingly, but the state of the recording medium may be determined in further detail, and the image forming conditions may be controlled base thereupon. Also, optimal image forming conditions may be controlled according to the amount of moisture on a case-by-case basis.

While the ultrasonic wave sensor 90 has been described as being fixed to the image forming apparatus 1 in the above-described embodiments, the ultrasonic wave sensor 90 may be configured to be detachable from the image forming apparatus 1. A configuration where the ultrasonic wave sensor 90 is detachable allows the user to easily replace a malfunctioning ultrasonic wave sensor 90, for example.

Also, the ultrasonic wave sensor 90 and sensor control unit 30, CPU 80, and other like control units in the above-described embodiments may be integrally configured and formed to be detachable from the image forming apparatus 1. Integrally forming the ultrasonic wave sensor 90 and control unit so as to be detachable allows the user to easily replace the ultrasonic wave sensor 90 with a new ultrasonic wave sensor 90 having updated or added functions.

While the embodiments have been described by way of an example of a laser beam printer, image forming apparatuses to which the present invention is applicable are not restricted thusly. Any apparatus which fix an image formed on a recording medium by heating the recording medium is applicable, including printers and copying machines using other recording methods, such as ink-jet printers and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-255668, filed Dec. 11, 2013, and Japanese Patent Application No. 2013-272034, filed Dec. 27, 2013 which are hereby incorporated by reference herein in their entirety.

What is claimed is:

1. A sensor to be attached to an apparatus having a fixing unit which fixes an image on a recording medium by heating the recording medium, the sensor comprising:

a transmission unit configured to transmit an ultrasonic wave to the recording medium;

a reception unit configured to receive the ultrasonic wave via the recording medium, and output a signal corresponding to the received ultrasonic wave; and a detecting unit configured to detect information relating to an amount of moisture which the recording medium contained prior to passing through the fixing unit or information relating to change in temperature of the recording medium due to having passed through the fixing unit, based on a first signal which the reception unit has output upon having received the ultrasonic wave before the recording medium has passed through the fixing unit, and a second signal which the reception unit has output upon having received the ultrasonic after the recording medium has passed through the fixing unit.

2. The sensor according to claim 1, wherein, in a case of the fixing unit fixing images on a first face and a second face of the recording medium, the detecting unit detects information relating to an amount of moisture which the recording medium contained prior to passing through the fixing unit or information relating to change in temperature of the recording medium due to having passed through the fixing unit, based on a first signal which the reception unit has output upon having received the ultrasonic wave before the fixing unit has fixed an image on the first face of the recording medium, and a second signal which the reception unit has output upon having received the ultrasonic wave before the fixing unit has fixed an image on the second face of the recording medium.

3. The sensor according to claim 1, wherein the second signal is a signal obtained when the output value of the signal, which the reception unit outputs upon having received the ultrasonic wave, has converged after the recording medium has passed through the fixing unit.

4. An apparatus comprising:

an image forming unit configured to form images on a recording medium, the image forming unit having a fixing unit which fixes an image on the recording medium by heating the recording medium;

a transmission unit configured to transmit an ultrasonic wave to the recording medium;

a reception unit configured to receive the ultrasonic wave via the recording medium, and output a signal corresponding to the received ultrasonic wave;

a detecting unit configured to detect information relating to an amount of moisture which the recording medium contained prior to passing through the fixing unit or information relating to change in temperature of the recording medium due to having passed through the fixing unit, based on a first signal which the reception unit has output upon having received the ultrasonic wave before the recording medium has passed through the fixing unit, and a second signal which the reception unit has output upon having received the ultrasonic wave after the recording medium has passed through the fixing unit; and a control unit configured to control an image forming condition of the image forming unit based on the information relating to an amount of moisture or the information relating to change in temperature of the recording medium detected by the detecting unit.

5. The apparatus according to claim 4, wherein, in a case of the fixing unit fixing images on a first face and a second face of the recording medium, the detecting unit detects information relating to an amount of moisture which the recording medium contained prior to passing through the fixing unit or information relating to change in temperature of the recording medium due to having passed through the fixing unit, based on a first signal which the reception unit has output upon having received the ultrasonic wave before the fixing unit has fixed an image on the first face of the recording medium, and a second signal which the reception unit has output upon having received the ultrasonic wave before the fixing unit has fixed an image on the second face of the recording medium.

6. The apparatus according to claim 4, wherein the second signal is a signal obtained when the output value of the signal, which the reception unit outputs upon having received the ultrasonic wave, has converged after the recording medium has passed through the fixing unit.

7. The apparatus according to claim 4, wherein the image forming condition is a temperature at the time of the fixing unit fixing an image on the recording medium.

8. The apparatus according to claim 4, wherein the image forming condition is a voltage value supplied to a transfer unit included in the image forming unit.

9. The apparatus according to claim 4, wherein the image forming condition is a conveying speed of the recording medium.

10. An apparatus comprising:

an image forming unit configured to form images on a recording medium, the image forming unit having a fixing unit which fixes an image on the recording medium by heating the recording medium;

a transmission unit configured to transmit an ultrasonic wave to the recording medium;

a reception unit configured to receive the ultrasonic wave via the recording medium, and output a signal corresponding to the received ultrasonic wave; and a control unit configured to control an image forming condition of the image forming unit based on a first signal which the reception unit has output upon having received the ultrasonic wave before the recording medium has passed through the fixing unit, and a second signal which the reception unit has output upon having received the ultrasonic wave after the recording medium has passed through the fixing unit, wherein the image forming condition is a temperature at the time of the fixing unit fixing an image on the recording medium.

11. The apparatus according to claim 10, wherein, in a case of the fixing unit fixing images on a first face and a second face of the recording medium, the control unit controls the image forming condition based on a first signal which the reception unit has output upon having received the ultrasonic wave before the fixing unit has fixed an image on the first face of the recording medium, and a second signal which the reception unit has output upon having received the ultrasonic wave before the fixing unit has fixed an image on the second face of the recording medium.

12. The apparatus according to claim 10, wherein the control unit controls the image forming condition based on the first signal, the second signal, and an amount of time until the fixing unit fixes an image on the second face of the recording medium.

13. The apparatus according to claim 10, wherein the second signal is a signal obtained when the output value of the signal, which the reception unit outputs upon having received the ultrasonic wave, has converged after the recording medium has passed through the fixing unit.

14. The apparatus according to claim 10, wherein the image forming condition includes a voltage value supplied to a transfer unit included in the image forming unit.

15. The apparatus according to claim 10, wherein the image forming condition includes a conveying speed of the recording medium.

16. The apparatus according to claim 10, wherein, in a case of the image forming unit consecutively forming images on a first face and a second face of a first recording medium and a second recording medium, the control unit controls the image forming condition for the second recording medium based on a first signal which the reception unit has output upon having received the ultrasonic wave via the first recording medium before the fixing unit has fixed an image on the first face of the first recording medium, and a second signal which the reception unit has output upon having received the ultrasonic wave via the first recording medium before the fixing unit has fixed an image on the second face of the first recording medium.

17. The apparatus according to claim 16, wherein the control unit controls the image forming condition based on the first signal, the second signal, and a third signal which the reception unit has output upon having received the ultrasonic wave via the second recording medium before the fixing unit has fixed an image on the first face of the second recording medium.

18. The sensor according to claim 1, wherein during a period after passing of a leading edge of the recording medium between the transmission unit and the reception unit before passing of a trailing edge of the recording medium between the transmission unit and the reception unit, the transmission unit transmits the ultrasonic wave to the recording medium, and the reception unit receives the ultrasonic wave via the recording medium, and outputs the first signal and the second signal respectively.

19. The apparatus according to claim 4, wherein during a period after passing of a leading edge of the recording medium between the transmission unit and the reception unit before passing of a trailing edge of the recording medium between the transmission unit and the reception unit, the transmission unit transmits the ultrasonic wave to the recording medium, and the reception unit receives the ultrasonic wave via the recording medium, and outputs the first signal and the second signal respectively.

20. The apparatus according to claim 10, wherein during a period after passing of a leading edge of the recording medium between the transmission unit and the reception unit before passing of a trailing edge of the recording medium between the transmission unit and the reception unit, the transmission unit transmits the ultrasonic wave to the recording medium, and the reception unit receives the ultrasonic wave via the recording medium, and outputs the first signal and the second signal respectively.

* * * * *